United States Patent [19]

Plotnikov et al.

[11] Patent Number: 4,994,721
[45] Date of Patent: Feb. 19, 1991

[54] ELECTRIC DRIVE

[76] Inventors: Andrei D. Plotnikov, prospekt Nastavnikov, 25, Korpus 3, kv. 101; Nikolai P. Popov, ulitsa Proletarskaya, 107, kv. 76, Kolpino; Grigory N. Klotsvog, ulitsa Gavanskaya, 11,kv. 43, all of Leningrad, U.S.S.R.

[21] Appl. No.: 444,138
[22] PCT Filed: Jun. 10, 1988
[86] PCT No.: PCT/SU88/00133
   § 371 Date: Nov. 22, 1989
   § 102(e) Date: Nov. 22, 1989
[87] PCT Pub. No.: WO89/12194
   PCT Pub. Date: Dec. 14, 1989

[51] Int. Cl.$^5$ .............................. H02P 3/00
[52] U.S. Cl. ..................... 318/434; 318/469; 251/129.12
[58] Field of Search .............. 318/434, 560, 566, 611, 318/626, 430, 449, 457, 465–470, 475, 635, 671, 63; 251/129.01, 129.12, 129.13

[56] References Cited

U.S. PATENT DOCUMENTS

| | | | |
|---|---|---|---|
| 3,616,884 | 11/1971 | Jürge | 251/129.12 |
| 3,682,283 | 8/1972 | Sato | 318/469 X |
| 3,891,908 | 6/1975 | Porras | 318/469 X |
| 4,546,281 | 10/1985 | Gladrich et al. | 251/129.12 |
| 4,770,390 | 9/1988 | Tratz et al. | 318/469 X |

Primary Examiner—William M. Shoop, Jr.
Assistant Examiner—A. Jonathan Wysocki
Attorney, Agent, or Firm—Burgess, Ryan & Wayne

[57] ABSTRACT

An electric drive comprises a base (1), an electric motor including a frame (2) and, mounted therein, a stator (3) and a rotor (4), a lead screw (5), an axial force limiter disposed between a bearing surface (12) of the base (1) and a pressure surface (13) of the frame (2) of the electric motor and comprising washers (9) and (10) with a resilient member (11) placed therebetween. The electric motor frame (2) is axially displaceable and kinematically coupled with the axial force limiter. The base (1) is provided with a stop (14) facing the pressure surface (13) of the frame (2), and the frame (2) is provided with a stop (15) facing the bearing surface (12) of the base (1).

2 Claims, 1 Drawing Sheet

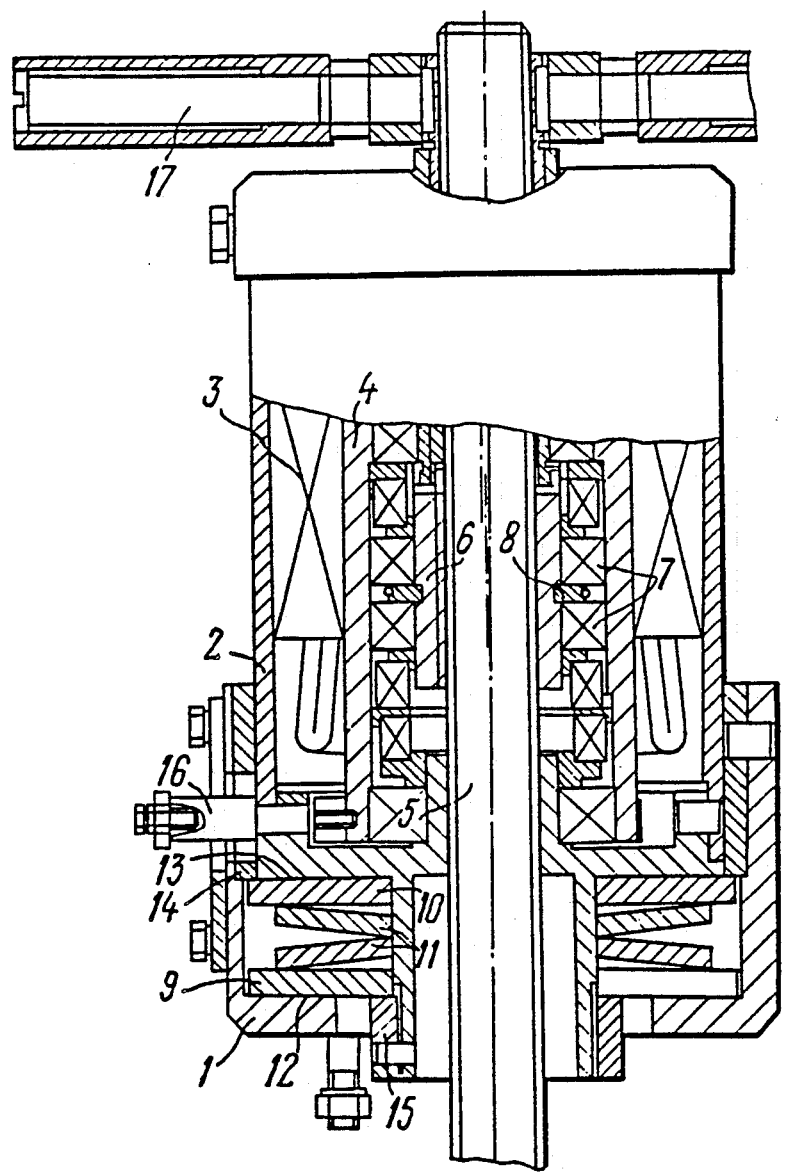

ELECTRIC DRIVE

FIELD OF THE INVENTION

The invention relates to devices designed to control mechanisms with translational movement of the actuator rods and more specifically, to electric drives for controlling the pipeline valves. The present invention can be most successfully used in chemical, gas, oil-refining, wood-pulp and paper industries, as well as in nuclear power engineering, ferrous and non-ferrous metallurgy, and other industries.

BACKGROUND OF THE INVENTION

The electric drives mounted on the actuators of pipe valves must be provided with limiters of the axial force (torque) transmitted to the actuator. It is generally preferred that this axial force limiter be available both when opening the stop valves and when closing the same. This necessitates the provision of a pair of limiters, resulting in increased overall dimensions of the electric drive.

Known in the art is an electric drive comprising an electric motor, a lead screw coupled to the actuator and connected with the shaft of the electric motor by a helical gearing, an axial force limiter formed by a pair of springs disposed along the electric motor shaft, with the drive gear of said gearing interposed therebetween and capable of being axially displaced. Each of said springs is connected with the corresponding microswitch (DE, C, 155950).

With an excessive axial force acting on the lead screw, the displacement of the screw is slowed down, and the driven gear of the gearing mounted thereon also slows down its rotation, while the drive gear keeps rotating. Due to the force component directed along the axis, the drive gear moves axially to either side, depending on the direction of the lead screw motion, against the pressure of the corresponding spring which is compressed to open the corresponding microswitch, and the electric motor is stopped.

Said electric drive suffers from a disadvantage consisting in its larger size as a result of the two springs provided in the axial force limiter and disposed along the electric motor shaft, for two opposite moving directions of the lead screw.

Known is an electric drive comprising a base, an electric motor including a frame with a stator and a hollow rotor mounted therein, a lead screw located in the hollow rotor, an axial force limiter comprising a washer and a resilient member with one end thereof contacting the washer, an assembly kinematically coupled with the axial force limiter and capable of being axially displaced, the axial force limiter being interposed between the bearing surface of the base and the pressure surface of the assembly kinematically coupled with the axial force limiter (FR, B, 2274859). In this apparatus, the assembly kinematically coupled with the axial force limiter is represented by a sliding nut locked against rotation relative to the rotor by means of a key and capable of being axially displaced, to some extent, with respect to the rotor. The extent of this displacement is limited by a pair of axial force limiters disposed on either side of the sliding nut, in its moving direction. When the axial force transmitted to the actuator is exceeded, the lead screw stops, and the sliding nut working against the force of the resilient member in a particular axial force limiter (depending on the direction of the lead screw motion) starts moving axially along the thread of the lead screw that has stopped, with respect to the rotor, thus limiting the axial force transmitted to the actuator.

One drawback of the apparatus described consists in considerable longitudinal dimensions of the electric drive due to the presence of two axial force limiters disposed on either side of the sliding nut. Besides, the two axial force limiters present in the apparatus result in its complicated design.

SUMMARY OF THE INVENTION

The principal object of invention is to provide an electric drive wherein the axial force limiter is made such that with a single axial force limiter, the axial force is capable of being limited both in the forward and in the backward moving directions of the lead screw, allowing a smaller size of the electric drive and its simpler construction.

With this principal object in view, there is provided an electric drive comprising a base, an electric motor including a frame with a stator and a hollow rotor mounted therein, a lead screw disposed in the hollow rotor, an axial force limiter comprising a washer and a resilient member with one end thereof contacting the washer, an assembly kinematically coupled with the axial force limiter and capable of being axially displaced, the axial force limiter being interposed between the bearing surface of the base and the pressure surface of the assembly kinematically coupled with the axial force limiter, wherein, according to the invention, the assembly kinematically coupled with the axial force limiter is the frame of the electric motor and the axial force limiter is provided with an additional washer in contact with the other end of the resilient member, said base being provided with a stop formed at the pressure surface of the electric motor frame, the electric motor frame being provided with a stop as viewed from the bearing surface of the base. So one of said washers of the axial force limiter contacts both the bearing surface of the base and the stop of the electric motor frame, whereas the other washer contacts both the pressure surface of the electric motor frame and the stop of the base.

The provision, in the axial force limiter, of an extra washer contacting the other end of the resilient member enables this member to be interposed between the two washers, thus providing compression of the resilient member of the axial force limiter in the forward and backward travelling directions of the lead screw, and disconnection of the electric motor.

The use of the electric motor frame as an assembly kinematically coupled with the axial force limiter and capable of being axially displaced, and the provision of stops formed in the above manner on the electric motor frame and on the base, enable the axial force to be limited, as the lead screw travels in both directions, by a single axial force limiter, reducing the size of the electric drive and simplifying its design.

BRIEF DESCRIPTION OF THE DRAWINGS

The present invention will be readily apparent from the following detailed description of an embodiment of an electric drive according to the invention, with reference to the accompanying drawing which represents a sectional view of the electric drive according to the invention.

BEST MODE TO CARRY OUT THE INVENTION

The proposed electric drive comprises a base 1, an electric motor including a frame 2 accommodating a stator 3 and a hollow rotor 4. A lead screw 5 connected with the actuator (not shown in the drawing for the sake of clarity) is placed coaxially within the hollow rotor 4. Disposed on the lead screw 5 and eccentric to its axis is a sliding nut 6 driven by the rotor 4 through bearings 7 and locked against axial displacement with respect to the rotor 4 by a ring washer 8. The electric drive further comprises an axial force limiter including two washers 9 and 10 and a resilient member 11 interposed therebetween and made in the form of a plate spring whose ends are in contact with the respective washers 9 and 10. The base 1 has a bearing surface 12, while the frame 2 of the electric motor has a pressure surface 13. The base 1 is provided with a stop 14 facing the pressure surface 13 of the electric motor frame 2, whereas the motor frame 2 is provided with a stop 15 facing the bearing surface 12 of the base 1. Therefore the washer 9 of the axial force limiter contacts both the bearing surface 12 of the base 1 and the stop 15 of the electric motor frame 2, while the washer 10 comes in contact both with the pressure surface 13 of the electric motor frame 2 and with the stop 14 of the base 1.

The frame 2 of the electric motor is designed to be axially displaced with respect to the base 1, serving as a unit kinematically coupled with the axial force limiter. The axial displacement of the electric motor frame 2 is achieved by virtue of a rigid attachment of the rotor 4 of the electric motor to the sliding nut 6.

Such embodiment of the axial force limiter and kinematic coupling between the frame 2 of the electric motor and the axial force limiter make it possible for the axial force to be limited by a single limiter, resulting in a smaller size of the electric drive and its simpler construction.

The frame 2 of the electric motor is connected with the electric motor switch (not shown for clarity) be means of a controlling pin 16. The electric drive is equipped with a manual doubler 17.

The operation of the electric drive now follows.

When the electric motor is actuated, the driving force from the rotor 4 is transmitted, through the bearings 7 and the sliding nut 6, to the lead screw 5 axially displaced by rotation of the sliding nut 6, whereby the locking member of the actuator linked with the lead screw 5 is either opened or closed, according to the direction of rotation of the rotor 4. If the axial force on the locking member exceeds the preset force on the resilient member 11, the lead screw 5 is stopped, and the rotor 4 keeps on rotating to turn the sliding nut 6 which is axially displaced along the thread of the lead screw 5 that has been stopped, e.g. moving downward, along with the rotor 4, the stator 3, and the frame 2 of the electric motor. Then the electric motor frame 2 has its pressure surface 13 thrust against the washer 10 of the axial force limiter, compressing the resilient member 11 to overcome the preset force on the resilient member 11. The washer 9 of the axial force limiter then rests against the bearing surface 12 of the base 1. The controlling pin 16 linked with the electric motor frame 2 presses on the electric motor switch and the electric drive is stopped.

When the rotor 4 is rotated in the opposite sense, the lead screw 5 moves likewise oppositely, and if the axial force is exceeded, the sliding nut 6 is caused to move upward along the thread of the lead screw 5 that has been stopped.

The electric motor frame 2 also moves up simultaneously. In so doing, the stop 15 of the electric motor frame 2 is thrust against the washer 9 of the axial force limiter, compressing the resilient member 11. The washer 10 of the axial force limiter then bears against the stop 14 of the base 1. As the electric motor frame 2 moves, the controlling pin 16 presses on the electric motor switch and the electric drive is stopped.

INDUSTRIAL APPLICABILITY

The present invention can be most successfully used in chemical, gas, oil-refining, wood-pulp and paper industries, as well as in nuclear power engineering, ferrous and nonferrous metallurgy, and other industries.

We claim:

1. An electric drive comprising
a base;
an electric motor comprising a frame with a stator and a hollow rotor mounted therein;
a lead screw mounted within the hollow rotor; an axial force limiter comprising a first washer having a pressure bearing face and a second washer having a pressure bearing face and a resilient member mounted between the first and second washer;
a first stop means operatively connected to the base and adapted to contact the pressure bearing face of the second washer; and
a second stop means mounted to the frame and adapted to contact the pressure bearing face of the first washer, wherein when the lead screw undergoes an axial force which exceeds a preadjusted resiliency of the resilient member, the frame moves in a direction opposite to the lead screw and compresses the resilient member through one of said washers to thereby cause the electric motor to stop.

2. The electric drive of claim 1 further comprising a slidable nut operably engaged to the lead screw and driven by the hollow rotor through at least one bearing.

* * * * *